United States Patent [19]

Tamulenas

[11] 3,762,388
[45] Oct. 2, 1973

[54] GASTIGHT JOINT BETWEEN THE CYLINDER COVER AND THE CYLINDER LINING OF INTERNAL COMBUSTION ENGINES

[75] Inventor: Konstantinas Tamulenas, Goteborg, Sweden

[73] Assignee: Aktiebolaget VOLVO, Goteborg, Sweden

[22] Filed: Dec. 14, 1971

[21] Appl. No.: 207,896

[30] Foreign Application Priority Data
Dec. 15, 1970 Sweden.............................. 16953/70

[52] U.S. Cl............ 123/193 CH, 92/171, 220/24.5, 220/46 R
[51] Int. Cl................................................. F02f 1/24
[58] Field of Search................ 123/193 CH; 92/171; 220/24.5, 46 R

[56] References Cited
UNITED STATES PATENTS
1,332,888  3/1920  Corson......................... 123/193 CH
1,825,769  10/1931  Barbarou....................... 123/193 CH
1,894,043  1/1933  Jones............................ 123/193 CH
2,101,030  12/1937  Kunze................................ 220/24.5
2,821,323  1/1958  Lee..................................... 220/24.5
3,648,572  3/1972  Fischer......................... 123/193 CH Primary Examiner—Clarence R. Gordon
Attorney—Edward Taylor Newton et al.

[57] ABSTRACT

A gastight joint between the cylinder cover and the cylinder lining of internal combustion engines. The joint comprises a collar portion on the lining having an upwardly flared configuration and being adapted to be received in a correspondingly flared channel in the cylinder cover and sealingly clamped therein with the aid of a pressure ring. When the ring is forced into the space between the collar portion of the lining and the cover channel it is deformed, thus providing a completely gastight seal without the aid of gaskets of any kind.

7 Claims, 5 Drawing Figures

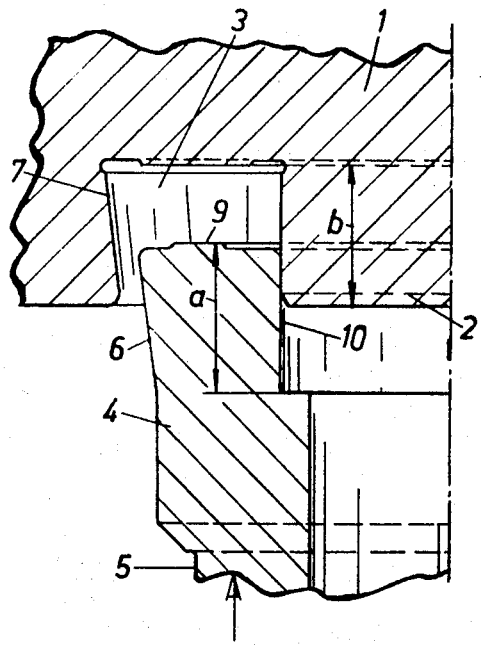
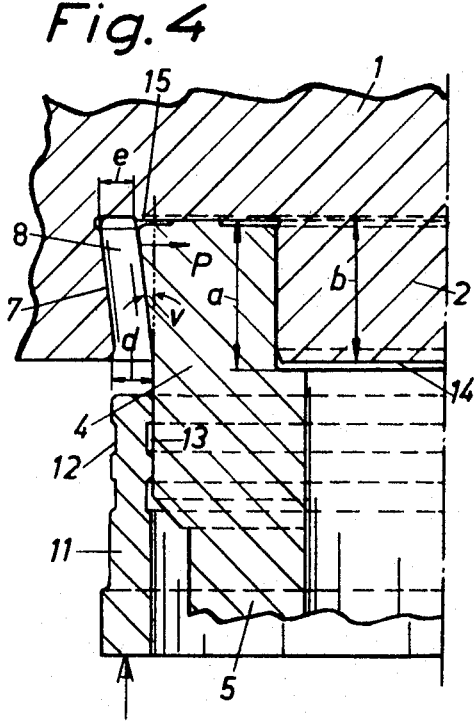
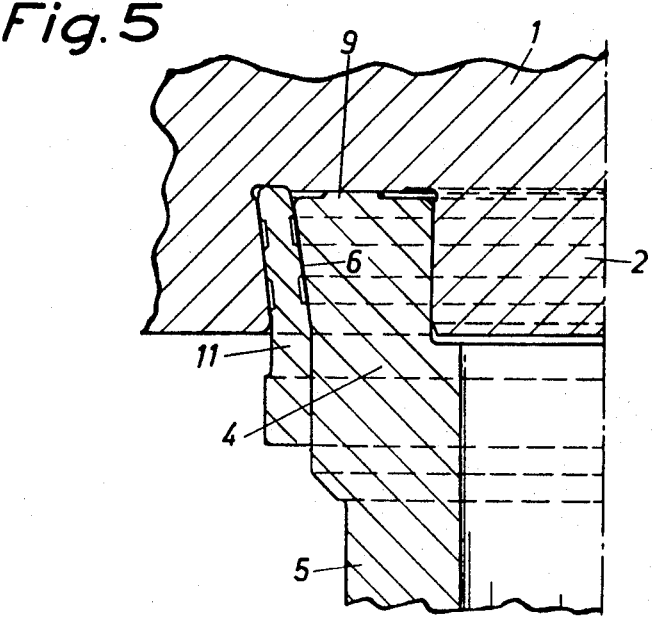

GASTIGHT JOINT BETWEEN THE CYLINDER COVER AND THE CYLINDER LINING OF INTERNAL COMBUSTION ENGINES

BACKGROUND OF THE INVENTION

A difficult problem, particularly in turbo-charged diesel engines, is to provide the necessary sealing between the cylinder cover and the cylinder block (cylinder lining). Hitherto, sealing has been effected with the aid of a cylinder head gasket which, however, in practice often has proved incapable of withstanding the high pressures existing inside the cylinder. To improve the sealing efficiency, use has been made of a screw joint between the cylinder cover and the cylinder lining. Also in this case it is necessary to use a cylinder head gasket, but on account of the screw joint the gasket is less exposed to stress. The structure is, however, both complicated and expensive.

SUMMARY OF THE INVENTION

The purpose of the present invention is to remedy the above-mentioned drawbacks and provide a joint so designed as to make the cylinder head gasket completely superfluous. The invention is characterised in that one end of the cylinder lining is inserted in an annular groove formed in the cylinder cover so as to be sealingly clamped in a position wherein it abuts radially against the inner jacket surface of the groove by means of a ring being pressed in between the cylinder lining and the outer jacket surface of the groove. Because of the heavy pressure exerted by the lining end against the inner jacket surface of the groove, arranged on a downwardly directed pipe stub, leakage of combustion gases out of the cylinder is prevented and the joint is made completely tight. Existing cylinder head screws absorb the high gas pressures inside the cylinder.

BRIEF DESCRIPTION OF THE DRAWING

The inventon will be decribed more in detail in the following with reference to the accompanying drawings wherein:

FIGS. 3–5 are longitudinal sections through the left side of the joint, illustrating three different stages of the assembly thereof.

DETAILED DESCRIPTION OF A PREFERRED EMBODIMENT

Figure 1:
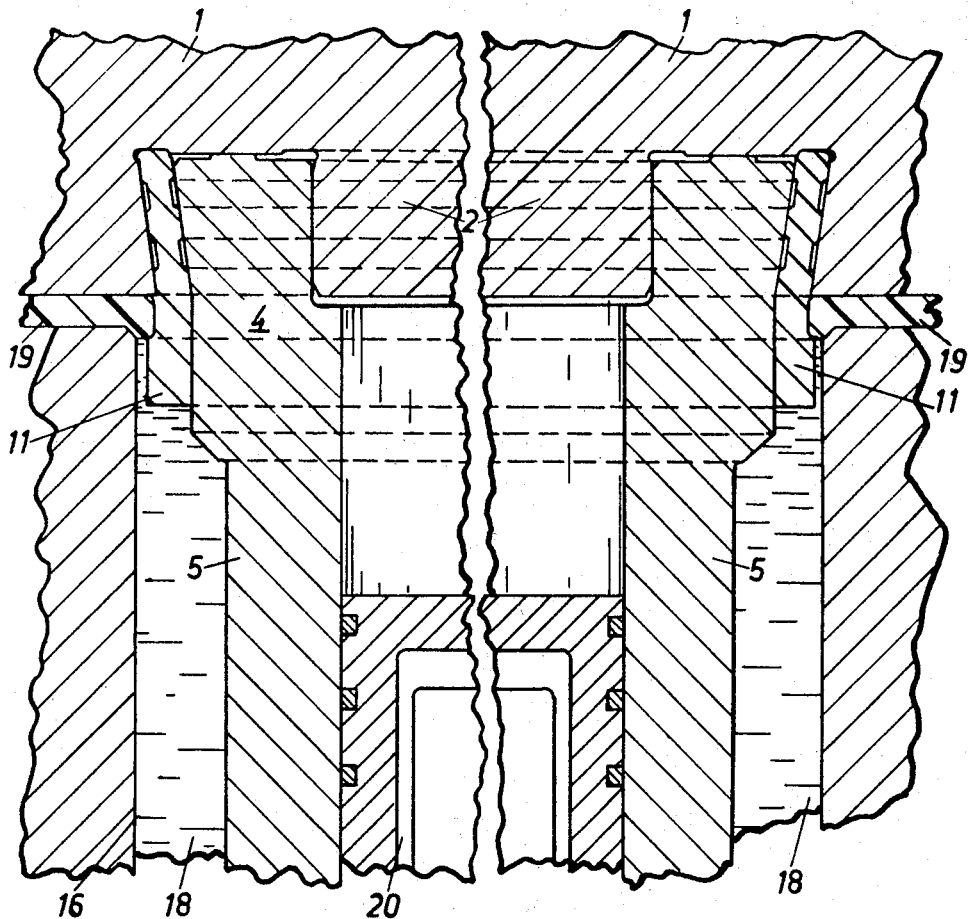
FIG. 1 is a broken vertical longitudinal section through one of the cylinders of the combustion engine incorporating a gastight joint in accordance with the invention inserted between the cylinder head and the cylinder lining.

The drawings show only those parts of the engine cylinder that are vital to the invention. The cylinder head 1 of the engine is formed with one downwardly directed pipe stub 2 for each cylinder, one annular channel 3 being made in the outer peripheral surface of the stub for receiving therein a collar-like portion 4 of the upper end of a cylinder lining 5 made from a suitable cast iron alloy. The dimensions of the pipe stub 2 and the cylinder collar portion 4 are chosen to permit the collar portion to be threaded over the stub 2 with a close fit, preferably press fit. The radially outer surface 6 of the collar portion 4 is flared conically upwards. Also the outer wall 7 of the channel 3 widens conically upwards.

When the cylinder lining 5 has been threaded over the pipe stub 2, i.e., when the upper end thereof extends into the channel 3, an annular interstice 8 still remains between the collar portion 4 and the groove wall 7, and this interstice 8 widens conically downwards at an angle of ½°. The height $a$ of the collar portion 4 exceeds, for instance by some millimeters, the height $b$ of the stub 2. The cylinder lining 5 is provided at its upper end face with an annular shoulder 9 which shoulder is positioned somewhat closer to the radially outer surface 6 of the collar portion 4 of the lining than to the radially inner surface 10 of said portion. The cone angle $v$ of the surface 6 preferably is between about 10° and 12°.

Figure 2:
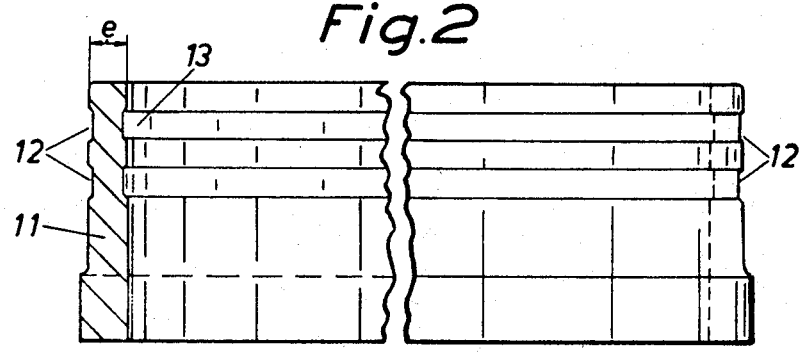
FIG. 2 is a similar longitudinal section through a pressure ring incorporated in the joint.

The pressure ring 11 (FIG. 2) pertaining to the joint is intended to be made from steel and its dimensions such that the ring may be threaded with a good fit over the collar portion 4 of the cylinder lining 5. The operative end (upper end) of the ring 11 has a thickness $d$ which by some tenths of a millimeter is less than the width $d$ of the interstice 8 at the lower interstice end and by some tenths of a millimeter exceeds the width $e$ of the interstice 8 at the upper interstice end. The ring 11 is both internally and externally provided with grooves 12, 13.

When assembling the joint one proceeds in the following manner. The cylinder head 1 is put upside down on a working table. The collar portion 4 of the cylinder lining 5 is threaded over the pipe stub 2. Subsequently, the steel ring 11 is passed over the collar portion 4 of the lining and for instance by means of a hydraulic press it is driven into the interstice 8 (FIGS. 4 and 5) wherein the operative end of the ring is securely clamped between the surfaces 6 and 7, possibly all the way home against the bottom of the groove 3. When the ring is being driven into position in this way, it is deformed, as appears from FIG. 5, as the collar portion 4 of the lining is forced radially against the pipe stub 2. Because the collar portion 4 in its position inside the channel 3 does not abut against the end surface 14 of the stub 2, and because the lining end is supported by means of the shoulder 9 thereon against the bottom 15 of the channel 3 close to the conical surface 6, and also because the pressure P from the pressure ring 11 is applied close to the lining end face, it is ensured that the lining surface 10 is pressed against the external surface of the pipe stub 2 adjacent the channel bottom 15. This provides for optimum pressing action and a complete sealing effect. The grooves 12, 13 absorbe any burrs that may generate when the ring 11 is being driven home. The ring is thereby prevented from "seizing" during driving.

The remaining of the cylinder linings of the combustion engine are mounted on their associate pipe stubs 2 on the cylinder head 1 in a similar manner. The head having its cylinder linings 5 mounted in their respective cylinder bores is mounted in the engine block 16 and secured by means of cylinder head screws (not illustrated). A gasket 19 for the water jacket 18 is previously secured between the engine block 17 and the cylinder head 1.

In order not to unnecessarily complicate the drawings the fuel injection means have not been shown. Reference number 20 designates one of the engine pistons.

The embodiment as described and illustrated is to be regarded as an example only and the shape of the cylinder head 1 as well as that of the cylinder lining 5 and the pressure ring 11 may be changed and modified in various ways within the scope of the appended claims. The material from which these parts are made is not esstential to the invention.

What I claim is:

1. An improved gastight joint between the cylinder cover and a cylinder lining of an internal combustion engine comprising a cylinder cover having an annular channel formed in its surface, a cylinder lining extending into said channel and radially abutting the inner wall thereof throughout the extent of such wall, and a ring force-fitted between said cylinder lining and said outer wall of said channel and sealingly clamping said lining into position.

2. An improved gastight joint between the cylinder cover and a cylinder lining of an internal combustion engine comprising a cylinder cover having an annular channel in its surface, a cylinder lining extending into said channel and radially abutting the inner wall thereof throughout the extent of such wall, and a ring force-fitted between said cylinder lining and the outer wall of said channel and sealingly clamping said lining into position, the bottom of said channel being wider than the mouth thereof, and the outer surface of the cylinder lining widening conically toward that end of the lining which is received in the channel.

3. A joint as in claim 2 wherein the outer wall of the channel and the outer surface of the cylinder lining converge, forming between them an interstice, said interstice being wider at the channel mouth than at the channel bottom.

4. A joint as in claim 2 wherein said lining is provided with an annular shoulder which is spaced from and overlaps that portion of the cover lying within the annular channel.

5. A joint as in claim 2 wherein said ring is provided with internal peripheral grooves.

6. A joint as in claim 2 wherein said ring is provided with external and internal peripheral grooves.

7. A joint as in claim 2 wherein said ring is provided with external peripheral grooves.

* * * * *